(12) United States Patent
Cook

(10) Patent No.: US 8,430,599 B2
(45) Date of Patent: Apr. 30, 2013

(54) METHODS AND COMPOSITION FOR IMPROVING SOIL QUALITY

(76) Inventor: Robin J. Cook, Troutdale, OR (US)

( * ) Notice: Subject to any disclaimer, the term of this patent is extended or adjusted under 35 U.S.C. 154(b) by 353 days.

(21) Appl. No.: 12/877,979

(22) Filed: Sep. 8, 2010

(65) Prior Publication Data

US 2012/0057936 A1 Mar. 8, 2012

(51) Int. Cl.
*B09C 1/08* (2006.01)
(52) U.S. Cl.
USPC ............ 405/128.75; 47/58.1 SC; 71/11; 71/23; 71/24; 71/903
(58) Field of Classification Search ........... 71/11–30, 71/903; 405/128.75; 47/58.1 SC
See application file for complete search history.

(56) References Cited

U.S. PATENT DOCUMENTS

| | | | | |
|---|---|---|---|---|
| 5,472,475 A | * | 12/1995 | Adam | 71/13 |
| 6,302,936 B1 | * | 10/2001 | Adam | 71/13 |
| 6,419,722 B1 | * | 7/2002 | Adam | 71/13 |
| 2002/0069685 A1 | * | 6/2002 | Adam | 71/11 |
| 2011/0044761 A1 | * | 2/2011 | Chang | 405/128.75 |
| 2011/0077155 A1 | * | 3/2011 | Goodwin | 504/101 |

OTHER PUBLICATIONS

Furuhata, Akira, "Soil conditioning materials and improvement of soil fertility", Nogyo oyobi Engei (1998), 73 (1), 199-204.*

* cited by examiner

*Primary Examiner* — Wayne Langel
(74) *Attorney, Agent, or Firm* — Mersenne Law LLC

(57) ABSTRACT

A soil-amendment product for preparing a damaged or degraded soil ecosystem to establish a self-sustaining floral/vegetative rhizosphere contains a mixture of composted organic biomass, fiber, charcoal, and small amounts of inoculants to promote the growth of beneficial microorganisms including mycorrhizal fungi and nitrogen-fixing bacteria. Embodiments also contain a water-holding agent such as a starch-based polymer that is effective to prevent water from flowing downhill or seeping away from the surface. Methods of application and other uses for the soil-amendment product are also described and claimed.

16 Claims, 1 Drawing Sheet

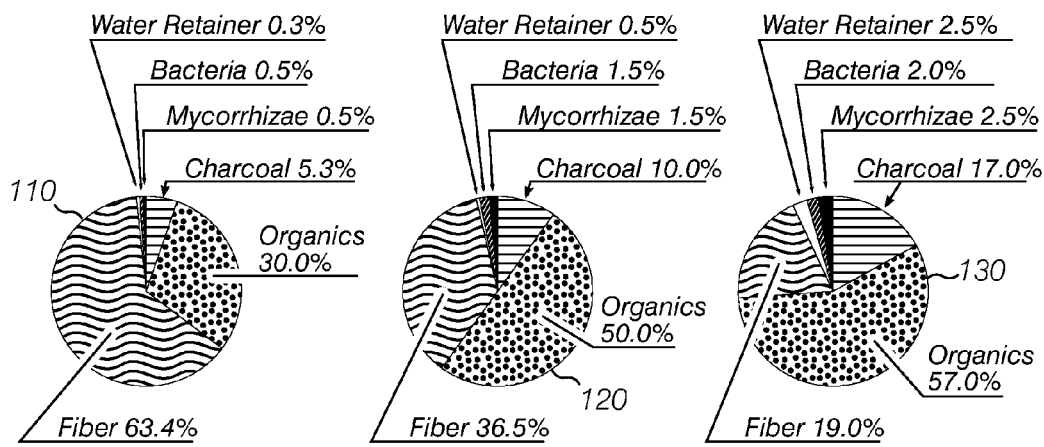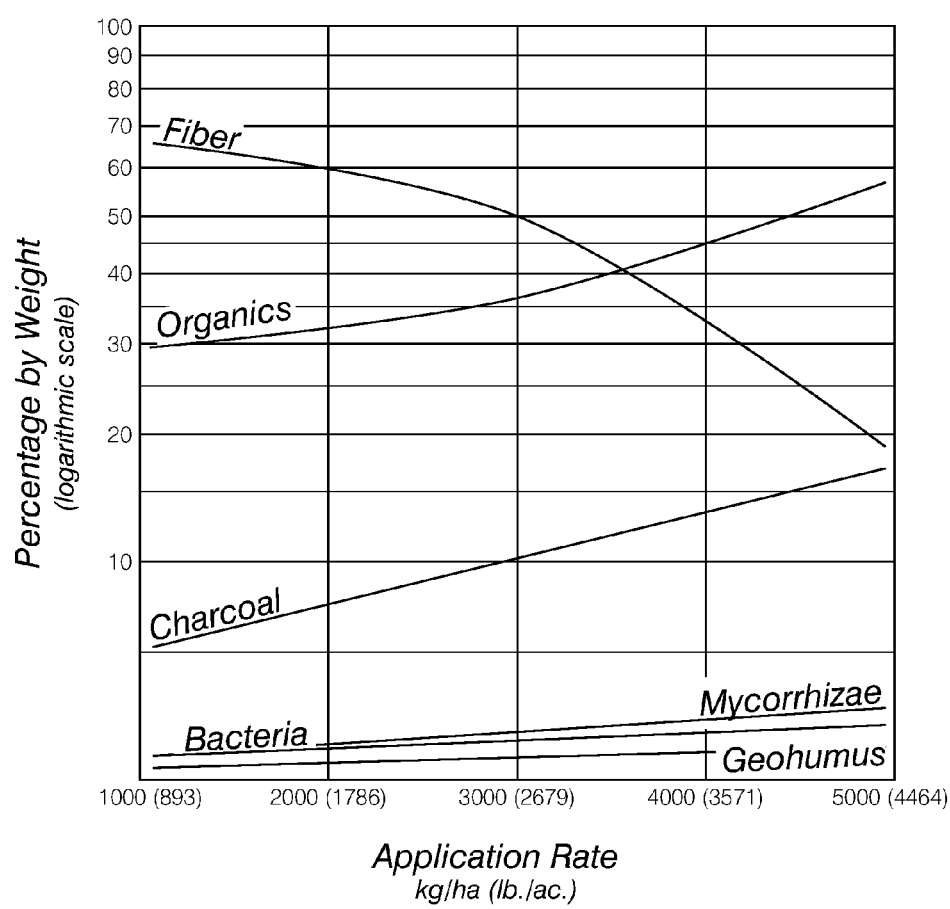

METHODS AND COMPOSITION FOR IMPROVING SOIL QUALITY

FIELD

The invention relates to improving soil condition to promote plant growth. More specifically, the invention relates to compositions and methods for establishing a self-perpetuating soil-plant ecosystem.

BACKGROUND

Humans have engaged in agriculture for millennia, and have developed a wide array of practices and products to achieve improved efficiency (i.e., greater production per cost or effort expended). For example, mechanically disturbing soil ("tilling" or "plowing") loosens the soil and improves plant-root penetration, while fertilization focuses on adding nutrients (nitrogen, phosphorus and potassium) to the soil so that they will be available to growing plants. Many prior-art practices and materials yield significant (but often declining) returns in productivity. Eventually, a greater investment of time, energy or materials, or even entirely different techniques, may be required to maintain accustomed yields.

On the other hand, land that is undisturbed, unprocessed and un-augmented, may nevertheless support a thriving complement of plant life from season to season, dependent principally on natural conditions such as amount of sunlight and rainfall or other water sources. In such a natural system, the variety of plant life provides numerous benefits, such as food and habitat for insects and other animals, processing of carbon dioxide from the atmosphere, and erosion control. However, once such a system is disturbed, it often takes years or decades to restore the prior balance.

Owners and stewards of land often wish to (re-)establish a "natural," self-perpetuating floral ecosystem on a parcel that has been disrupted by fire, flood, or development such as mining, construction or grading. Current practices include removing and storing the topsoil of an area that will be affected, and replacing the topsoil later (e.g., after construction); or applying compost or fertilizer to attempt to restart plant growth. These approaches are often expensive, and sometimes fail to work on the first few attempts. Techniques and materials to accomplish revegetation with reduced recurring effort or investment may be of value in this field.

SUMMARY

A soil-amendment composition that includes partially-decomposed organic biomass, a fiber matrix, charcoal, bacterial and fungal agents, and a water-holding material can "jump start" a revegetation process in degraded environments, allowing the re-establishment of a self-sustaining ecosystem with reduced need for repeated applications of physical and/or chemical interventions.

BRIEF DESCRIPTION OF DRAWINGS

Embodiments of the invention are illustrated by way of example and not by way of limitation in the figures of the accompanying drawings in which like references indicate similar elements. It should be noted that references to "an" or "one" embodiment in this disclosure are not necessarily to the same embodiment, and such references mean "at least one."

The FIGURE shows a graph of relative ratios of ingredients of a beneficial soil-amendment composition versus mass-per-area application rates.

DETAILED DESCRIPTION

One embodiment of the invention is a method for formulating effective soil amendment compositions for application to land to be revegetated, while other embodiments are such compositions individually, or as applied. Embodiments can reduce cost and improve outcomes when rebuilding damaged soil ecosystems.

Soil-amendment embodiments comprise several principal ingredients, to which optional materials may be added in specific situations. The basic embodiments combine partially-decomposed organic material and fiber, charcoal, fungal and bacterial agents, and a material that is adapted to hold water in place (rather than allowing it to flow away down a grade or deeper underground). These ingredients are selected to mimic functions of material found in a natural, self-sustaining rhizosphere. Some of them are consumed or broken down by the first generation of plants, but those plants replace the consumed elements when they die, so subsequent generations of plants have the benefit of similar resources. In preferred embodiments, recycled and organic ingredients are selected to reduce the environmental impact of producing the amendment product, and to avoid introducing materials which might degrade or decompose into detrimental contaminants.

The main ingredient (by weight or by volume) in most embodiments is a fibrous organic biomass, which serves as an initial source of food and shelter for the microorganisms described below, and also provides structure ("matrix") to the applied material, helping it remain in place after application. The biomass may include partially-decomposed ("composted") organic plant material (e.g., peat) and fibrous material such as burlap, jute, hemp or straw. In most embodiments, the fibrous organic biomass comprises between about 75% and about 94% by weight of the mixture, with varying ratios of composted organics and fiber.

In a preferred embodiment, a sedge and/or rush peat, such as the Dakota Peat product from Dakota Peat & Equipment of Grand Forks, N. Dak., makes up between about 30% and about 60% of the fibrous organic biomass. Similarly, in another preferred embodiment, most of the remainder of the fibrous organic biomass is a mixture of one or more of the following materials: recycled coffee-bean bags (burlap), jute fiber, hemp and shredded straw. Other types of peat, such as the more-common sphagnum moss, may also be used as composted organic material. In some embodiments, general compost (i.e., aerobically-decomposed vegetable matter) from leaves, grass clippings, fruit and vegetable debris, and so on, may supplement or even replace the peat.

The fibrous organic biomass materials may be prepared by shredding or grinding to between about 10 mm and about 375 mm (0.5" to 1.5") for compatibility with application equipment, as discussed below.

The next-largest fraction in most embodiments is charcoal. This ingredient provides a readily-available carbon source and serves as a substrate or host material for microbial development. Since a function of the microbes is to break down biomass into basic nutrients required by growing plants, charcoal is an important part of the chain of nutrient exchange between plant roots and the soil they grow in, supporting healthy plant establishment and development. Charcoal helps the mixture filter and retain water, and can immobilize or ameliorate the effects of some contaminants. Embodiments can use either ordinary or activated charcoal. (The difference is in the preparation of the charcoal: ordinary or non-activated charcoal is produced by anaerobic pyrolysis of organic biomass such as wood [usually]; while activated charcoal has been further processed with heat or chemicals to increase its surface area.) Embodiments contain charcoal between about 5% and about 25% by weight.

Finally, embodiments include three additional ingredients in smaller amounts (by weight), but these are important to the efficacy of the mixture. The first of these is a fungus or fungal spore that is effective to promote the development of beneficial mycorrhizae. Mycorrhizae are symbiotic associations between a fungus and the roots of a vascular plant (such as the plants that are being introduced to an area treated with this mixture). In this disclosure, mycorrhiza or mycorrhizae should be understood to refer to fungi, fungal spores, or other agents present in an embodiment that promote the development of mycorrhizae, and not (for example) merely the fully-formed symbiotic association itself.

Mycorrhizae may be subdivided into three general types: endomycorrhiza, ectomycorrhiza and ericoid mycorrhiza, according to the physical and functional characteristics of the symbiosis. *Pisolithus tinctorius, Laccaria bicolor, Suillus luteus* and *Suillus bovines* are species of fungus that may be used as the mycorrhizae-promoting agent in an embodiment, but they are not the only ones (nor need an embodiment use only one species).

A suitable product for this ingredient of an embodiment is available commercially as MycoApply Micronized Endo/Ecto mycorrhizal powder consisting of a blend of spores from endo- and ecto-fungi species. Mycorrhizae-promoting agents are present in embodiments between about 0.5% and about 5% by weight.

The second trace ingredient is one or more microbes (e.g., bacteria), which function alone or in association with plants to fix atmospheric nitrogen into ammonia and other nitrogen-containing substances (which may then be used by the growing plants). Hundreds of different species of bacteria may be used in this application. Some commonly-available genera are *Azospirillum, Bacillus, Streptomyces, Rhizobium, Pseudomonas* (e.g., *Pseudomonas fluorescens*) and *Xanthomonas*. Commercially-available products MicroMX Microbiological Organics and TazoAZ Azospirillum Bacteria from TerraMax Inc. of Cottage Grove, Minn., may be used. An embodiment may contain a monoculture or a mixture of such microbes, at a concentration between about 0.5% and about 5% by weight.

Note that both fungal spores and bacteria are extremely lightweight (low mass). Pure spores or bacteria at the 0.5%~5% by weight ranges given above would contain far more microorganisms than required in an embodiment. The "by-weight" ranges presume that the organisms are commercially packaged in powder, flake, granule, pellet or similar forms. Such packages contain a large amount (by weight) of inert filler material. This facilitates preparation of bulk mixtures such as embodiments of the invention by allowing weight-based recipes and by simplifying mixing procedures to achieve even distribution of the microorganisms throughout the product.

An effective quantity of microorganism inoculants (mycorrhizae-promoting agents and bacteria) for an embodiment can also be determined based on a biological-activity study of the organisms in the embodiment, compared to an embodiment formulated by weight using commercially-packaged organisms as described above. In other words, the important criterion in preparing a soil-amendment product according to an embodiment of the invention is not the weight of the microorganism-plus-filler, but the number of live or viable organisms present in the mixture when it is applied. For example, in an embodiment formulated at 1.5% by weight of the mycorrhizae-promoting agent MycoApply Micronized Endo/Ectos, the resulting mixture contains approximately 3,300 spores per kilogram (1,500 spores per pound). Similarly, in an embodiment formulated with 0.75% by weight of each of MicroMX Microbiological Organics and TazoAZ Azospirillum Bacteria, the resulting mixture contains about $1.386 \times 10^{10}$ organisms per kilogram ($6.285 \times 10^9$ per pound).

The final trace ingredient in an embodiment functions to retain water and reduce its tendency to drain away from the surface to which the embodiment is applied. In a preferred embodiment, this material is Geohumus®, a patented (U.S. Pat. No. 5,734,2058, U.S. Pat. No. 7,652,080) starch-based polymer that absorbs water and turns into a gel-like substance. Other hydrogel-like synthetic substances can also be used, although their use may be less ecologically sound. This substance must be operative to hold water in place, but it must also be able to return the water to plants growing in the area. Embodiments contain between about 0.25% and about 3% by weight of such water-retaining substances.

It is appreciated that many water-retaining substances can absorb many times their weight in water, and therefore their weight can vary. The target range for this ingredient (0.25% to 3% by weight) is to be measured when the substance is dry (or, in the case of materials such as Geohumus® which are provided slightly moistened to improve their performance, when it contains only a small fraction of the total amount of moisture it can absorb). When a composition according to an embodiment is applied using a hydroseeder, as described below, the water-retaining substance will absorb water during the application process itself and may consequently make up a larger percentage by weight of the applied material than of the material before application.

FIG. 1 shows how the composition of embodiments may vary depending on the intended application rate of the mixture (given in kilograms per hectare or pounds per acre). For example, pie chart 110 shows that an embodiment for application at the relatively low density of 1000 kg/ha (893 lb./ac.) contains 30% by weight of composted organic biomass ("Organics"), 63.5% by weight of fiber, 5.3% by weight of charcoal, 0.5% by weight of mycorrhizae-promoting agent, 0.5% by weight of nitrogen-fixing microbes, and 0.3% by weight of a water-retaining agent. This formulation would be suitable for use in an area with some existing organic material, moderate fertility and good water-holding capacity.

Pie chart 120 shows that an embodiment for application at an intermediate density of 3000 kg/ha (2679 lb./ac.) contains 50% by weight of composted organic biomass, 36.5% by weight of fiber, 10% by weight of charcoal, 1.5% by weight of mycorrhizae-promoting agent, 1.5% by weight of nitrogen-fixing microbes, and 0.5% by weight of a water-retaining agent. This formulation would be suitable for relatively depleted soils with little organic material, low fertility and moderate water-holding capacity.

Pie chart 130 shows that an embodiment intended for application at a high density of 5000 kg/ha (4464 lb./ac.) contains 57% by weight of composted organic biomass, 19% by weight of fiber, 17% by weight of charcoal, 2.5% by weight of mycorrhizae-promoting agent, 2% by weight of nitrogen-fixing microbes, and 2.5% by weight of a water-retaining agent. This formulation would be suitable for highly depleted subsoils, with almost no organic material, very low fertility and little or no water-holding capacity.

A number of factors affect the exact formulation chosen. Several of the ingredients are relatively expensive, so one naturally wishes to include as small an amount as will be effective. Thus, for example, at low application rates, the relative amount (by weight) of the trace ingredients (mychorrhizae-forming agents, nitrogen-fixing microbes and water-retaining material) may be higher than when an embodiment for heavier application is being formulated.

Other ingredients may optionally be added to an embodiment in certain situations. For example, one may add vermiculite or other inert material (up to about 50% by weight) to improve percolation and reduce bulk density. Adding such inert mineral compounds is beneficial when using an embodiment as a complete soil replacement, rather than as a soil amendment. For example, a mixture prepared from an amendment-formulated composition may be "diluted" by adding 50% by weight of vermiculite, and the result would perform well as potting soil.

A soil-amendment composition according to an embodiment of the invention can be applied to large areas efficiently by using a hydroseeder. In some applications, the composition is mixed with the seeds of plants that are desired and sprayed on the damaged or degraded surface. The composition absorbs water during the hydroseeding process and holds it in place, where it is available for the germinating seeds to use.

Other formulations may be spread by hand (using, e.g., rakes or other implements), or by tractor or similar vehicle. It is preferable that the mixture be allowed to absorb water, either during or soon after application.

In the preceding description, numerous details were set forth. It will be apparent, however, to one skilled in the art, that the present invention may be practiced without some of these specific details. In some instances, well-known structures and devices are shown in block diagram form, rather than in detail, so as to avoid obscuring or obfuscating the invention.

The applications of the present invention have been described largely by reference to specific example formulations and percent-by-weight recipes. However, those of skill in the art will recognize that other effective soil-amendment mixtures not specifically identified above can nevertheless be produced by adjusting the ingredient ratios within the ranges recited below. Such variant formulations are understood to be captured according to the following claims.

I claim:

1. A soil amendment composition comprising:
66-93.5% by weight of fibrous organic biomass;
5-25% by weight of charcoal;
0.5-3% by weight of a mycorrhizae-promoting agent;
0.5-3% by weight of a microbial component; and
0.5-3% by weight of a water-storing compound.

2. The composition of claim 1 wherein the fibrous organic biomass comprises 30-60% by weight of partially-decomposed organic material and 20-66% by weight of fiber.

3. The composition of claim 2 wherein the partially-decomposed organic material consists primarily of sedge and rush peat.

4. The composition of claim 2 wherein the partially-decomposed organic material consists primarily of sphagnum moss peat.

5. The composition of claim 2 wherein natural burlap, jute fiber, hemp fiber and shredded straw make up at least half of the fiber component.

6. The composition of claim 2 wherein the fiber component comprises recycled coffee-bean bags.

7. The composition of claim 1 wherein the fibrous organic biomass comprises at least one member selected from the group consisting of partially-decomposed leaves, partially-decomposed grass trimmings, partially-decomposed fruit debris and partially-decomposed vegetable debris.

8. The composition of claim 1 wherein the charcoal is an organic charcoal.

9. The composition of claim 1 wherein the charcoal is activated charcoal.

10. The composition of claim 1 wherein the mycorrhizae-promoting agent consists primarily of MycoApply Micronized Endo/Ectos.

11. The composition of claim 1 wherein the mycorrhizae-promoting agent consists primarily of an endo/ecto blend of mycorrhizae inoculants.

12. The composition of claim 1 wherein the microbial component consists primarily of MicroMX Microbiological Organics.

13. The composition of claim 1 wherein the microbial component consists primarily of TazoAZ Azospirillum Bacteria.

14. The composition of claim 1 wherein the water-storing compound is an organic starch-based polymer.

15. The composition of claim 1 wherein the water-storing compound is Geohumus®.

16. A soil amendment product for application by hydroseeder at about 4,483 kilograms per hectare (4,000 pounds per acre) comprising:
approximately 50% by weight of sedge and rush peat;
approximately 36.5% by weight of burlap, jute fiber and shredded straw;
approximately 10% by weight of non-activated charcoal;
approximately 1.5% by weight of a mycorrhizae-promoting substance;
approximately 1.5% by weight of one or more nitrogen-fixing bacteria; and
approximately 0.5% by weight of a starch-based polymer that forms a water-storing gel.

* * * * *